April 21, 1936.　　　E. E. WEMP　　　2,038,016
CLUTCH
Original Filed May 14, 1928　　2 Sheets-Sheet 1

INVENTOR
Ernest E. Wemp
BY
ATTORNEY

April 21, 1936.  E. E. WEMP  2,038,016
CLUTCH
Original Filed May 14, 1928   2 Sheets-Sheet 2
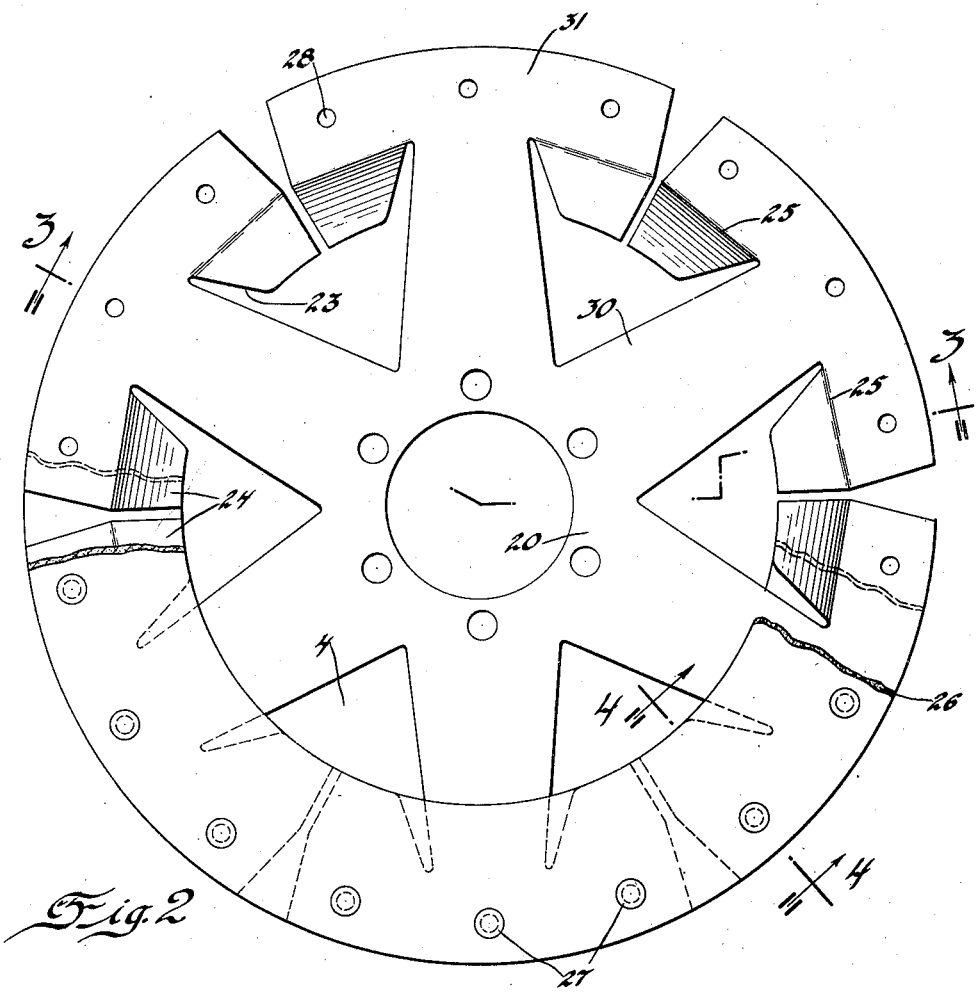
Fig. 2
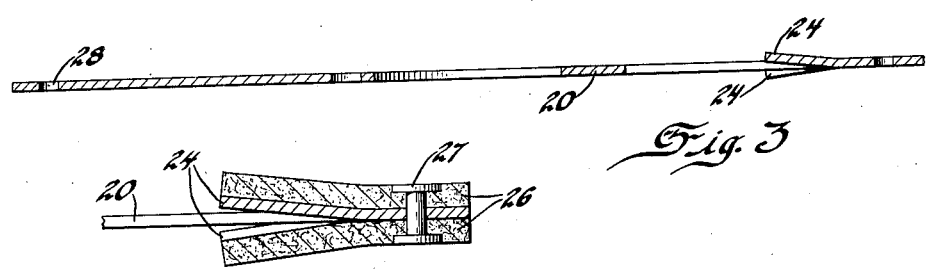
Fig. 3
Fig. 4
INVENTOR
Ernest E. Wemp
BY
ATTORNEY Patented Apr. 21, 1936

2,038,016

UNITED STATES PATENT OFFICE 2,038,016

CLUTCH

Ernest E. Wemp, Detroit, Mich.

Original application May 14, 1928, Serial No. 277,470. Divided and this application June 6, 1930, Serial No. 459,606. Renewed October 8, 1934

25 Claims. (Cl. 192—107)

This invention relates to a clutch especially adapted for use in an automotive vehicle.

The object of the invention is to provide an improved construction which gives a nicety of action when the clutch is operated to establish a driving connection between an engine and mechanism driven thereby. The construction includes a disk-like member provided with a facing material for effecting frictional engagement with another clutch part. This member to which the frictional engaging material is attached is constructed so that it flexes in the operation of the clutch. This flexing takes place at a point in close proximity to the frictional engaging material, and it is a further object of the invention to so associate this flexing member and the engaging material so that there will be no binding between these two members when the flexing takes place, and so that the frictional engaging material will not be unduly distorted, broken, or otherwise rendered defective.

This application is a division of application Serial Number 277,470 filed May 14, 1928.

In the drawings:

Fig. 2 is a face view of a member of the clutch constructed in accordance with the invention with some of the friction material cut away.

Fig. 3 is a section on line 3—3 of Fig. 2.

Fig. 4 is an enlarged sectional view taken on line 4—4 of Fig. 2.

Figure 1:
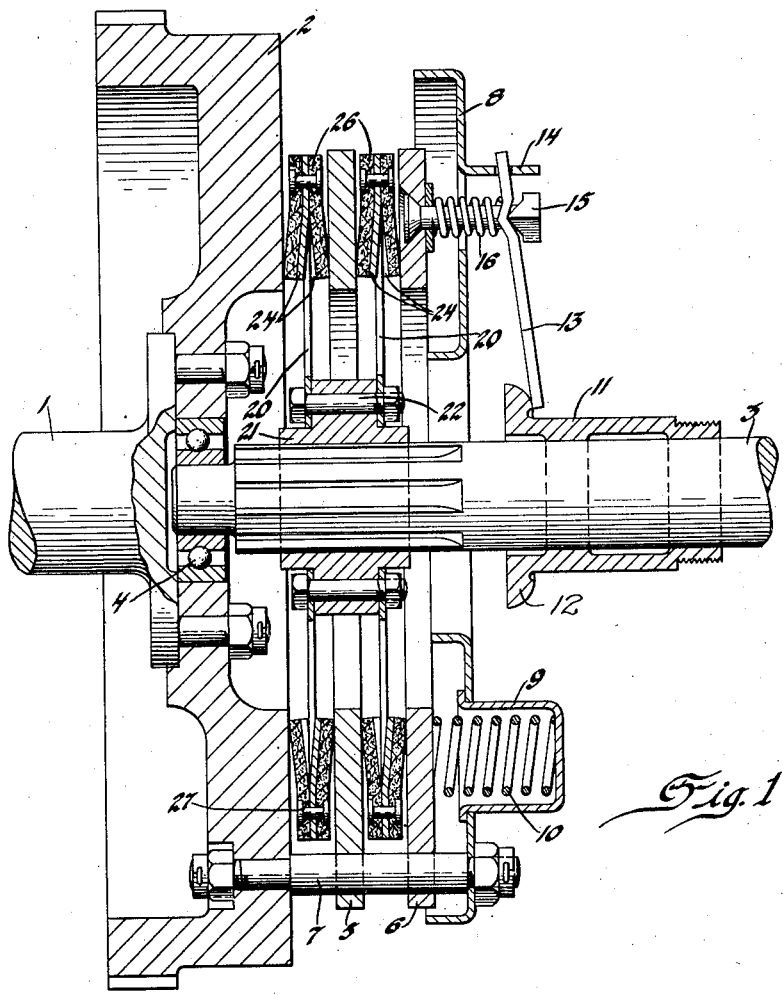
Fig. 1 is an assembly view in section showing a clutch construction embodying the invention with the clutch in released position.

In the accompanying drawings a driving shaft, which may be the crank shaft of an engine, is shown at 1, and mounted on the shaft is a fly wheel 2. A shaft 3 is driven through the clutch construction soon to be described, and one end of this shaft is journaled in a suitable bearing 4. This shaft 3 is ordinarily the main driving shaft extending into the conventional transmission.

The clutch construction embodies driving members 5 and 6 connected to the fly wheel by means of bolts 7 with these driving members slidable upon the bolts. A cover plate 8 is provided which is also carried by the bolts 7. The cover plate is provided with devices for holding packing springs; these devices may take the form of cup-like members 9 each for holding a spring 10 which tends to pack the driving members and the fly wheel together. One face of the fly wheel in the present construction acts as a driving member.

For the purpose of controlling the action of the clutch, a sleeve 11 may be mounted on the shaft 3 and provided with a collar 12 which engages levers 13 fulcrumed as at 14 on the cover plate and operably associated with the bolts 15 connected to the driving member 6. There may be a coil spring 16 interposed between the plate 6 and each lever for holding the lever outwardly against the headed end of the bolt 15.

The construction thus described represents one form of clutch structure in which the present invention can be used. This structure need not be described in further detail, inasmuch as such an arrangement is well known to those versed in the art; for example, there are a number of packing springs 10 arranged circumferentially around the cover plate, and also a number of operating levers 13 all of which contact with the collar 12 on the sleeve, and a bolt for each lever.

The driven parts of the clutch plates are disks 20 which may be connected to a hub 21 by means of suitable bolts 22 with the hub splined on the shaft 3.

Referring to Fig. 2, it will be noted that the disk 20 is of spoked formation and that each spoke has an enlarged end portion. More specifically, the spokes are enlarged circumferentially at their ends.

Alternating wings are arranged to extend angularly with regards to the plane of the disk and in opposite directions. One wing may be bent slightly with regards to the disk in one direction and the next adjacent wing may be bent in a similar manner in the opposite direction, as indicated in Fig. 3. This bending of wings is shown in the several views of the drawings in quite an exaggerated manner for the purpose of clearness in depicting the invention. The material of which the disk is made is more or less springy so that the wings retain this position normally but can be flexed. The line of flexing movement is illustrated at 25 and this line occurs substantially at the point where the wings are bent angularly as regards the disk. This line of bending is substantially normal to an adjacent radial line.

The spokes are illustrated at 30 and their enlarged heads at 31; thus each spoke generally is of T shape. The cross bars of the several Ts cooperate to provide the peripheral edge of the disk. The cross bar of each T has on its under side (the side inwardly of the side forming the peripheral edge of the disk) is provided with wings which extend angularly from the normal plane of the disk. These wings are shown at 24. The wings are provided by suitably forming the under side of the cross bars of the T as by means of notching the same as at 23. An advantageous form is to have alternate wings extend in opposite directions outwardly as regards the plane of the disk, and the wings have a bend line as at 25, the bend line being substantially located at the bottom of an adjacent notch.

This driven disk is provided with suitable friction material for frictional engagement with the driving parts of the clutch, and for this purpose the friction material as shown at 26, may be secured thereto by rivets 27 passing through apertures 28 in the disk. This construction is rather clearly shown in the enlarged view of Fig. 4.

The friction material is preferably of a width greater than the wings and is secured to the disk at points other than the wings on the disk. For this purpose the material is fastened to the parts of the T radially outward of the wings in such manner that all securing rivets are located preferably on one side of the bend lines. It will be noted that the frictional engaging material is thus secured to the disk at points which remain substantially in the plane.

In Fig. 1, the clutch construction is shown in released position. This is effected in the well known manner by sliding the sleeve 11 from left to right by a suitable pedal or lever, thus retracting the driving member 6 against the action of the packing springs. In this position the wings on the driven disks assume their normal deflected positions and thus separate the outer edges of the frictional engaging material. When the clutch is engaged, the packing springs cause the driving members to move together and the first engagement with the driven member is substantially a line contact with the inner edges of the frictional engaging material, as will be appreciated by an inspection of Fig. 1. As the engagement of the clutch progresses, the wings are flexed in toward the plane of the driven disk, and there occurs a progressive increase of surface of frictional engagement between the driving members and the frictional material on the driven member. This construction gives a nicety of action in the clutching operation.

The frictional engaging material employed is preferably a rather stiff composition and it will be appreciated that if this material were tied to the flexing wings that there would be a binding between the disk and the engaging material upon the flexing of the wings. This would result in undue distortion of the material with the probabilities of shortening the life of the clutch.

However, the clutch material is secured to the non-flexing face of the disk only, and not attached to both this part of the disk and the wings. Accordingly, there is freedom for relative movement between the flexible wings and the frictional material.

While the invention is shown as being embodied in a clutch having two driven disks, the prevailing clutch construction at the present time is the use of only a single driven disk, and the invention is applicable to a single disk clutch construction as well as to the clutch construction as shown.

By thus constructing the driven member of the clutch the facing material, or the material which frictionally engages the driving member, may be secured to the disk by any suitable number of securing means such as rivets, bolts, or the like. In other words, the engaging material is secured directly against a non-flexing face of the disk and rivets may be secured therethrough in as many places as is necessary to make an adequate connection. The flexing parts are out of the way, so to speak, and offer no incumbrance to the securing of the engaging material to the disk.

I claim:

1. A driven member for a clutch comprising substantially a disk having a hub portion, radially extending spoke-like members having enlarged heads forming substantially a T shape, the under side of the cross bar of each T having a part extending angularly as regards the plane of the member.

2. A driven member for a clutch comprising substantially a disk having a hub portion, radially extending spoke-like members having enlarged heads forming substantially a T shape, the under side of the cross bar of each T having a part extending angularly as regards the plane of the member, said parts on opposite sides of the radial portion extending in opposite directions.

3. A clutch disk, comprising a member substantially of disk form having radially extending members defined and spaced apart by apertures extending through the disk inwardly of the periphery, the material defining the outer wall of said openings comprising parts extending angularly from the plane of the disk.

4. A clutch disk, comprising a member substantially of disk form having radially extending members defined and spaced apart by apertures extending through the disk inwardly of the periphery, the material defining the outer wall of said openings comprising wings extending angularly from the plane of the disk with adjacent wings extending angularly to opposite sides of the disk.

5. A clutch disk, comprising a member substantially of disk form having a hub portion, the main body portion of the disk comprising T shaped spokes extending radially from the hub portion and with the cross bars of the Ts cooperating to provide the periphery of the disk, the under side of each cross bar having a wing on each side of the radially extending member, said wings being disposed angularly as regards the plane of the disk, with one wing extending angularly in one direction and the other wing extending angularly in another direction.

6. A clutch disk, comprising a member substantially of disk form having a hub portion, the main body portion of the disk comprising T shaped spokes extending radially from the hub portion and with the cross bars of the Ts cooperating to provide the periphery of the disk, the under side of each cross bar having an angularly disposed wing upon each side of the radial part of the spoke with the wings extending angularly to opposite sides of the normal plane of the disk, and facing material overlying the wings.

7. A clutch disk, comprising a member substantially of disk form having a hub portion, the main body portion of the disk comprising T shaped spokes extending radially from the hub portion and with the cross bars of the Ts cooperating to provide the periphery of the disk, the under side of each cross bar having an angularly disposed wing upon each side of the radial part of the spoke with the wings extending angularly to opposite sides of the normal plane of the disk, and facing material overlying the wings, said facing material being secured to the disk radially outward of the angular wings.

8. A clutch member comprising a disk like body, a ring of facing material on each side of the body near its outer periphery, and means securing the rings of facing material to the body and located entirely outside radially of the center line of the rings of facing material between the inner and outer peripheral edges thereof.

9. A clutch member comprising a spoked disk, rings of facing material one on each side of the disk disposed near the outer periphery of the disk, and securing means passing through the facing material for securing the rings of facing material to the disk, said securing means being located entirely outside radially of a center line between the inner and outer peripheral edges of the rings of facing material.

10. A clutch driven member comprising a disk formed of radial spokes, a ring of facing material on each side of the disk near its outer periphery, said spokes having axially spaced portions over which the rings of facing material lie for holding the rings of facing material axially spaced apart near their inner peripheral edge, and securing means passing through the rings of facing material for securing the same to the disk, said securing means being located entirely outside radially of a center line between the inner and outer peripheral edges of the rings of facing material.

11. A clutch driven member comprising a body of disk form having spokes, a ring of facing material on each side of the disk near its outer periphery, said spokes being arranged in relation to each other so as to present axially spaced spoke parts over which the rings of facing material lie for holding the rings of facing material spaced apart near their inner peripheral edges, and securing means passing through the rings of facing material for securing the same to the disk body, said securing means being located outside radially of the center line between the inner and outer peripheral edges of the rings of facing material.

12. The combination with a mat disc of a disc type clutch and with opposed friction facings, of means extended from the disc to resiliently support staggered portions of the opposed facings in an inclined position converging toward a common plane at the outer periphery of the facings.

13. The combination with a mat disc of a disc type clutch and with opposed friction facings related to the disc, of means on the disc to resiliently support staggered portions of the opposed facings so that the respective outer peripheries of the facings are parallel, and the said staggered portions converge from the inner toward the outer peripheries of the facings.

14. The combination with a mat disc of a disc type clutch and with opposed friction facings related to the disc, of means on the disc to resiliently support staggered portions of the opposed facings so that the respective outer peripheries of the facings are parallel, and the said staggered portions converge from the inner toward the outer peripheries of the facings, and means to secure the facings to said supporting means adjacent the outer peripheries thereof.

15. In a clutch disc a plurality of staggered fingers converging outwardly toward the same plane, and friction facings secured on said fingers.

16. In a friction disc a plurality of staggered resilient fingers, the adjacent fingers converging outwardly toward the same plane, and friction facings secured on said fingers.

17. In a clutch disc a plurality of staggered resilient fingers, the adjacent fingers converging outwardly so that the outer portions of all the fingers are disposed in the same plane, and friction facings secured on said fingers.

18. In a clutch disc a plurality of staggered resilient fingers, the adjacent fingers converging outwardly so that the outer portions of all the fingers are in the plane of the disc, and friction facings secured on said fingers.

19. In a clutch disc a plurality of staggered resilient fingers, the adjacent fingers converging outwardly so that the outer portions of all the fingers are in the center plane of the disc, and friction facings secured on said fingers.

20. In a clutch disc, a plurality of radial staggered fingers on the disc converging toward the plane of the disc, opposed friction facings on the opposite sides of the fingers, and means adjacent the outer peripheries of the facings to secure the facings to the fingers.

21. In a clutch disc, a plurality of radial staggered fingers on the disc converging toward the plane of the disc, and friction facing rings secured at the outer peripheries thereof to the respective sides of the fingers.

22. In a clutch, a clutch disc, radial staggered fingers extended from the disc and converging outwardly toward the plane of the disc, and facings secured adjacent the outer peripheries thereof to said fingers to be normally tipped from a plane parallel with the disc, and to deform the fingers from the natural position thereof when the clutch is engaged.

23. In a clutch of the disc type, a clutch disc, a plurality of staggered fingers extended from the disc, alternate fingers being offset out of the planes of the opposite faces of the disc and converging so that the outer ends thereof are aligned in the plane of the disc, and ring-like friction facings on the opposite sides of the fingers being secured adjacent the outer peripheries thereof to the said staggered fingers.

24. A clutch driven member adapted to be packed between driving members comprising, a disc-like body structure, a pair of frictional facing rings for engagement with driving members and positioned on opposite sides of the body structure adjacent the periphery of the body structure and secured thereto, said body structure having portions underlying the facings and which converge in a direction toward the periphery of the body structure for holding the facing rings spaced apart at their inner peripheral edges a distance greater than the distance at their outer peripheral edges, said converging portions being flexible and adapted to be substantially collapsed under packing pressure applied to the facing rings to allow the facing rings to come into substantial parallelism.

25. A clutch driven disc adapted to be packed between clutch driving members comprising, a sheet metal disc-like body member, a pair of frictional facing rings secured on opposite sides of the disc near the outer periphery thereof, said body member having portions underlying the facing rings which are spaced axially from each other at the inner peripheral edges of the facing rings and which converge in an outward direction to hold the facing rings spaced apart axially at their inner peripheral edges a distance greater than the spacing at their outer peripheral edges, said portions being flexible and adapted to substantially collapse under packing pressure applied to the facing rings whereby the facing rings come into substantial parallelism.

ERNEST E. WEMP.